Patented Feb. 11, 1941

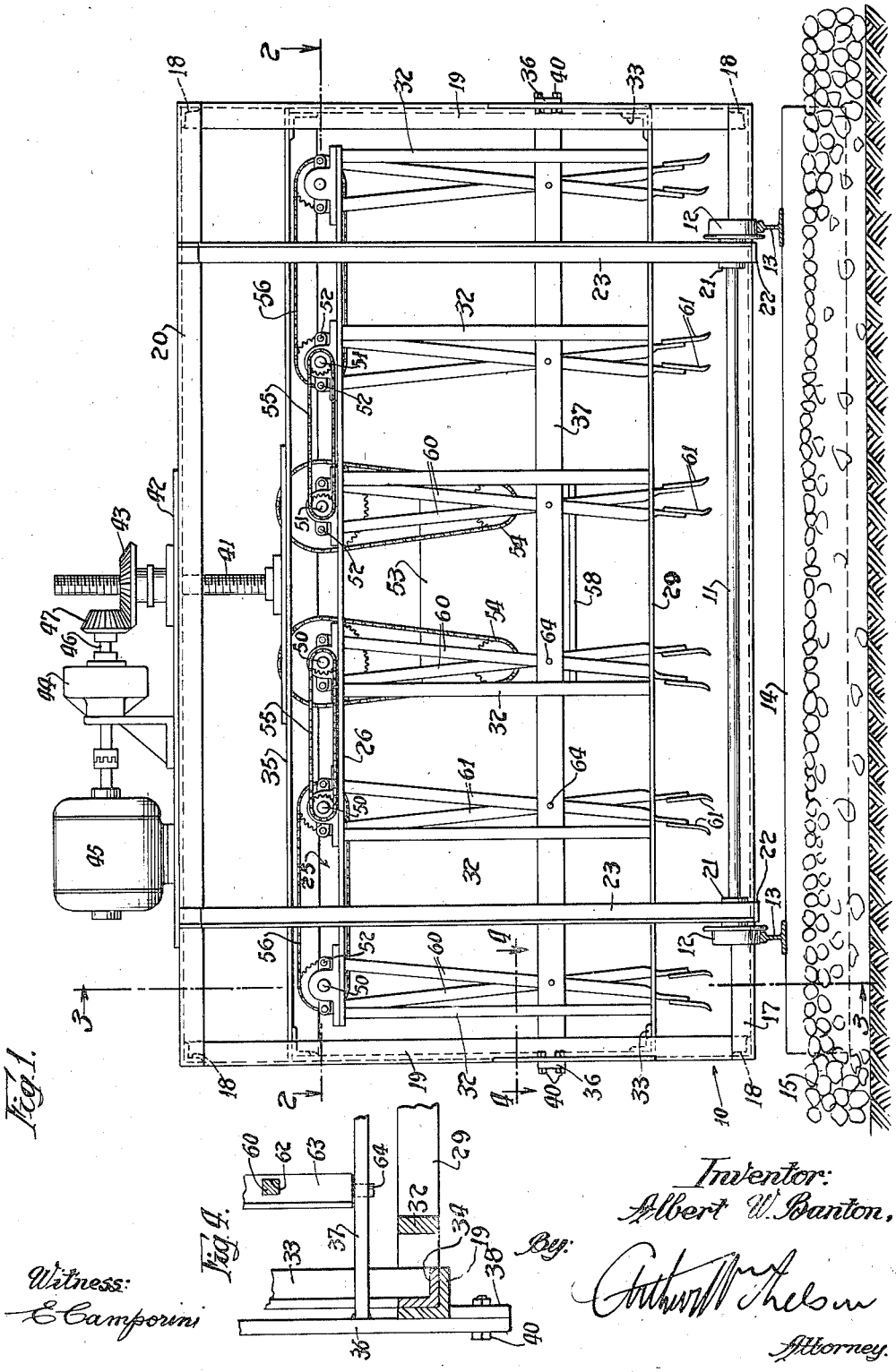

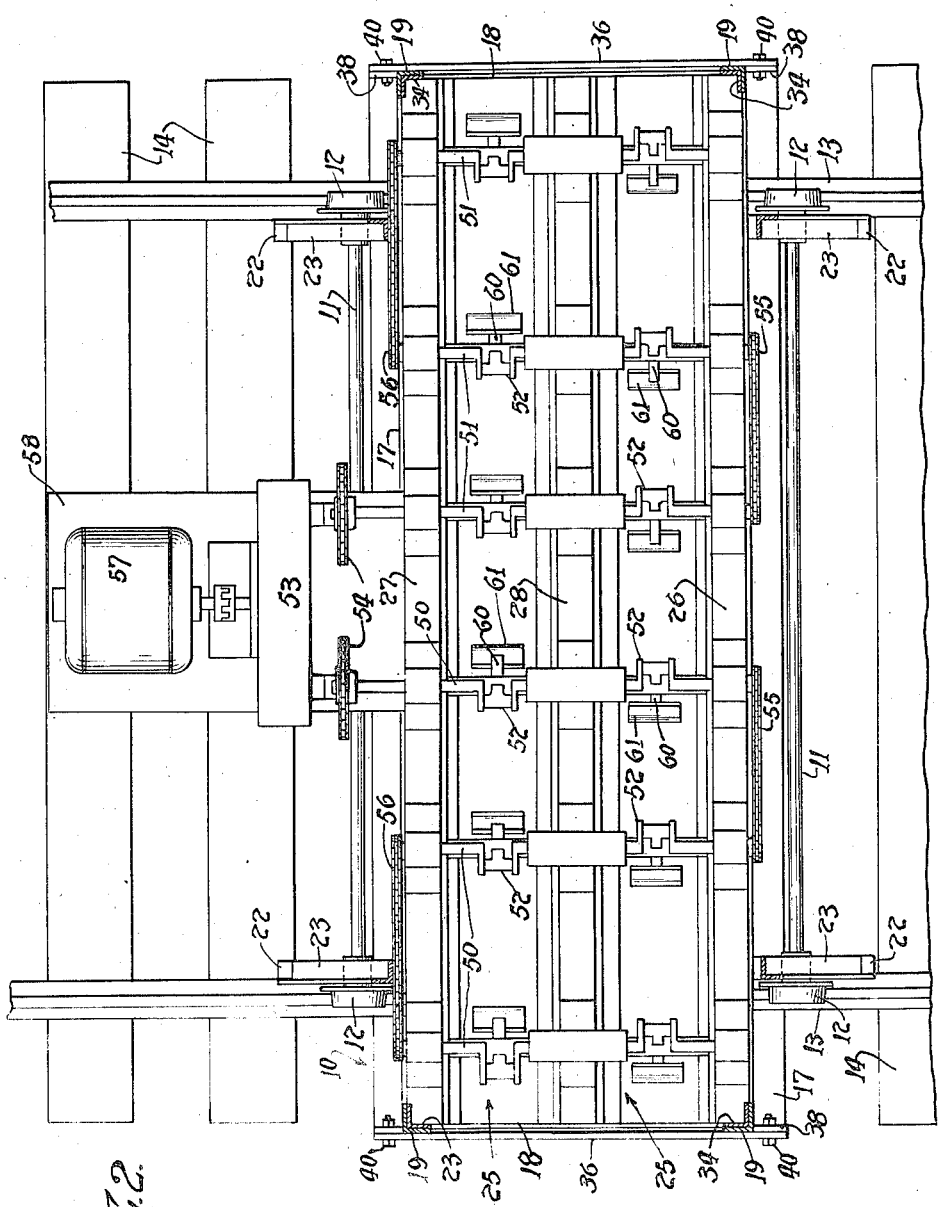

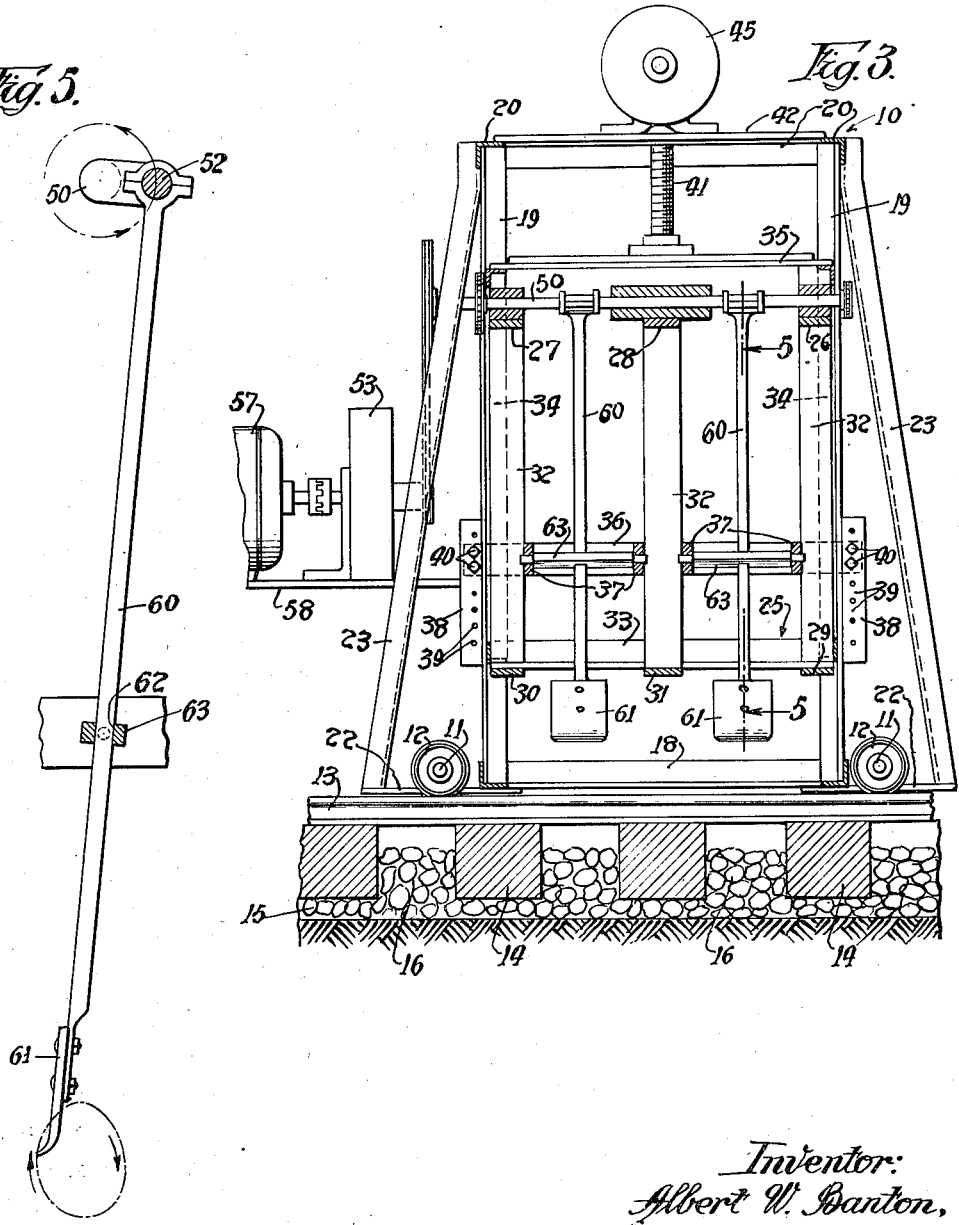

2,231,177

UNITED STATES PATENT OFFICE 2,231,177

BALLAST CRIBBING MACHINE

Albert W. Banton, East Chicago, Ind.

Application January 22, 1940, Serial No. 314,981

11 Claims. (Cl. 37—104)

This invention relates to improvements in ballast cribbing machines and it consists of the matters hereinafter described and more particularly pointed out in the appended claims.

One of the objects of the present apparatus is to provide a machine for travel upon the rails of a railway track for removing ballast from the "cribs" or spaces between the ties of the track and which shall be of a simple construction and shall operate efficiently.

Another object of the invention is to provide a machine of this kind whereby the shovel-like ballast engaging members are caused to be moved in an orbital path and may be lowered toward the ballast as the ballast is removed from between the ties, to maintain the said members in the best operating position or may be raised into a position to clear crossings and switches as the machine travels along the rails of the track.

Again, it is an object of the invention to provide a machine for cribbing ballast on single or doubletrack roadbeds and which machine may be caused to throw the ballast all to one side of a track or throw parts of the ballast to each side of the track.

The above mentioned objects of the invention, as well as others, together with the several advantages thereof will appear as the specification proceeds.

In the drawings:

Fig. 1 is a view in end elevation of a ballast cribbing machine embodying the preferred form of the invention.

Fig. 2 is a horizontal sectional view through a part of the machine as taken on the line 2—2 of Fig. 1 with certain parts omitted for the sake of clarity.

Fig. 3 is a transverse vertical sectional view through the improved machine as taken on the line 3—3 of Fig. 1.

Fig. 4 is a horizontal detail sectional view through a part of the machine, on an enlarged scale, as taken on the line 4—4 of Fig. 1.

Fig. 5 is a detail vertical sectional view, on an enlarged scale, through a part of the machine as taken on the line 5—5 of Fig. 3 and illustrates more clearly the orbital path of one of the ballast cleaning members or shovels and which will be more fully referred to.

Referring now in detail to that embodiment of the invention illustrated in the drawings, 10 indicates the main frame of the machine as a whole in the lower portion of which are axles 11—11 upon which wheels 12 are mounted for travel upon the rails 13 of a railway track. The track, as shown herein includes ties 14 for the support of the rails and which ties are seated upon the ballast 15 in longitudinally spaced relation to provide the inter-tie spaces or cribs 16 as shown in Fig. 3.

The main frame includes a horizontally disposed rectangular base, wider than it is long and comprising front and rear structural members 17—17 and side angles 18. At each corner of the base and rising therefrom are corner posts 19 in the form of angle bars. The top end of the corner posts which, as shown herein, are four in number, are connected by suitable front, rear and side structural members 20. The axles 11 are located fore and aft the base of the main frame 10 and are journalled in bearings 21 supported by plates 22 each suitably fixed at one end to the structural members 17. The outer ends of these plates may be braced from the front and rear structural members 20 of the main frame, by means of inclined angle bar members 23. With the main frame structure made as shown and described, the ends thereof project laterally beyond each rail as best appears in Fig. 1.

25 indicates a secondary frame arranged within the main frame for a raising and lowering movement therein by reason of a guiding engagement with the corner posts 19. The secondary frame comprises front, rear and intermediate top members 26—27 and 28 respectively and front, rear and intermediate bottom members 29—30 and 31 respectively, the like top and bottom members being connected together by upright posts 32. The ends of the bottom members 29—30 and 31 are connected by cross bars 33 and to said cross bars are connected upright angle bar rails 34 that slide in the corner posts 19 of the main frame. The top ends of the upright rails 34 extend into an elevation above that of the top members 26—27 and 28 before referred to and are there all operatively connected together by a horizontal member 35.

There is a side bar 36 secured at its ends with respect to the posts of each pair of corner posts 19, at each side of the main frame. The bars 36 at both sides of the main frame support pairs of bars 37—37 disposed in planes between those of the members 26—27 and 28 and the members 29—30 and 31 respectively and the purpose of the bars 37 will soon appear. The side bars 36 may be adjusted vertically of the posts of the pairs of corner posts supporting them and this adjustment may be afforded by the following construction. Each corner post as herein shown, carries a plate 38 with a vertical row of holes 39 therein and the ends of each bar 36, which overlap the plates 38, carry bolts 40 to be entered into the desired holes 39 which give the proper elevation for said bars.

The entire secondary frame has a raising and lowering movement in the main frame, so as to be disposed at the desired elevation therein by the following mechanism: 41 indicates an upright screw that is fixed at its bottom end to the member 35 forming the top for the secondary frame. The top end of this screw extends well above a plate 42 carried by the front, rear and side bars 20 that form the top for the main frame. This screw also extends through and has threaded engagement in an upwardly facing bevel gear 43 which while rotative with respect to the top plate is fixed against a vertical movement with respect to said plate. Supported on said plate is a reversible gear reduction set 44 driven by a motor 45. The gear reduction set has a driven shaft 46 to which is fixed a pinion 47 that meshes with the bevel gear 43. When the motor is energized, the pinion 47 may be caused to rotate in either direction to drive the bevel gear 43. When this gear is driven in one direction or the other, it will cause a raising or lowering movement of the secondary frame so that the same may be positioned at the desired elevation with respect to the main frame.

Other forms of raising and lowering means may be provided for the secondary frame, such as an hydraulically actuated one instead of the motor driven gear and screw structure just described.

Two sets of crankshafts 50 and 51 are disposed above and extend transversely across the top members 26—27 and 28 of the secondary frame and are journalled in suitable bearing therein. Each crank shaft of both sets 50 and 51 is provided with diametrically opposed crank arms 52 arranged in plane between said members 26—28 and 28—27 respectively. The crank shafts are illustrated in Fig. 2 as being arranged in sets of three disposed upon opposite sides of the longitudinal plane of the main frame. The crank shafts in both sets may be driven in the same direction or the crank shafts in one set may be driven clockwise and those in the other set may be driven counter-clockwise. As shown herein the inner crankshaft of both sets is driven from a reversible gear change transmission 53 and each intermediate crankshaft has a chain and sprocket driving connection 54 with one end of the inner crankshafts 50—51 and has a chain and sprocket driving connection 55—56 with the other crankshafts of the same set as appears in Fig. 2. The transmission 53 is driven by a motor 57 and said motor and transmission are supported by a platform 58 as appears in Fig. 3 and which platform is operatively connected to the secondary frame before mentioned so as to raise and lower therewith.

A pair of beams 60 is associated with each crank shaft and has a strap connection at its top end with an associated crank arm. The bottom end of each beam carries a shovel-like ballast engaging member 61. The members 61 carried by the beams 60 associated with the crank shafts 50 face in one direction while the members 61 carried by the beams 60 associated with the crankshafts 51 face in the other direction.

The mid portion of each beam has a sliding guided engagement in a bearing opening 62 in an associated rocking or pivotal axis bar 63. The beams 60 preferably have a rectangular cross section and the openings 62 have a shape to correspond with that section and thereby the beams cannot twist so as to bind on its crank arm 52. As shown herein each axis bar has end trunnions 64 and these have bearing in openings provided in the bars of the pairs of bars 37 previously mentioned. It is apparent that when the crankshafts 50—51 are being driven, the crank arms 52 thereon cause the upper end portions of the respective beams to travel in the crank arm circle. This causes the beams to slide through the axis bars 63 which of course turn on their trunnions so that the ballast engaging members 61 travel in orbital paths with a pawing or scooping action.

The crank arms 52 of the set of crankshafts 50—51, as well as the members 61 actuated thereby are of course spaced apart, fore and aft of the machine as a whole, to accord with the intertie space or ballast cribs 16 between adjacent ties 14.

In the operation of the structure described, the members 61 of the beams in both sets thereof throw the ballast of the crib outwardly in opposite directions. It is apparent that all members 61 of both sets of said members may be made to throw all of the crib ballast in the same direction by changing the direction of rotation of one set of crankshafts and changing the members on the beams in one set to face in the same direction as these in the other set.

As the ballast is removed from the cribs between the ties, the secondary frame is lowered according to the level of the ballast in said crib by the use of the motor 45 and gear reduction set 47 before mentioned. As the secondary frame is thus lowered, the beams 60 will slide through the axis bars 63 and this will elongate the horizontal dimension of the orbital paths of the members 61 without affecting the vertical dimensions thereof.

If it is desired to retain the same horizontal dimensions of the orbital paths as before, then it is only necessary to lower the bars 37 to accord to the lowering of the secondary frame. This may be brought about by removing the bolts 40 from the bars 36 and plates 38 and replacing them in those holes 39 in said plates which provide the desired position for said bars.

Assume that the car is approaching a crossing or switch so that it becomes necessary to raise the members 61 into a position clearing said crossing or switch. This is done by causing the pinion 47 to drive the bevel gear 43 in that direction which will raise the secondary frame to that elevation affording the desired clearance. After the crossing or switch has thus been cleared, the pinion 47 is caused to be driven in the direction operating to lower the secondary frame back into its working position.

As shown herein, certain of the beams 60 are disposed within the vertical planes of the rails and the others are disposed outside of said vertical planes. Thus they operate upon ballast both inside and outside the rails.

The machine is simple in construction for the functions performed and it is efficient in operation for its intended purpose. It may be readily operated to raise the members 61 to clear crossings and switches and to return or lower said members 61 to working position.

While in describing the invention I have referred in detail to the form, arrangement and construction of the parts involved, the same is to be considered only as by way of illustration and therefore I do not wish to be limited thereto except as may be specifically pointed out in the appended claims.

I claim as my invention:

1. Apparatus for removing ballast from between the ties of a railway track embodying therein a car for travel upon the rails of said track, substantially upright guide means on said car, means engaged in said guide means for adjustment toward and away from the track, a substantially upright beam, means providing a horizontal pivotal axis on the car and with which the beam has a longitudinal guided movement, a ballast engaging member on the bottom end portion of the beam for movement in an orbital path into and out of the ballast between adjacent ties of the track, and means carried by said second mentioned means and operatively connected to a top end portion of the beam for moving its associated ballast engaging member in an orbital path.

2. Apparatus for removing ballast from between the ties of a railway track embodying therein a car for travel upon the rails of said track, substantially upright guide means on said car, means engaged in said guide means for adjustment toward and away from the track, a plurality of substantiatlly upright beams, one arranged on each side of the longitudinal center of the track, means providing a horizontal pivotal axis on the car for each beam and with which each beam has a longitudinal guided movement, a ballast engaging member on the bottom end portion of each beam for movement in orbital paths into and out of the ballast between adjacent ties of the track, and means carried by said second mentioned means and operatively connected to the top end portion of each beam for moving the associated ballast engaging members in out of phase orbital paths.

3. Apparatus for removing ballast from between the ties of a railway track embodying therein a car for travel upon the rails of a railway track, substantially upright guide means on said car, means engaged in said guide means for adjustable movement toward and away from the track, power means on said car and operatively connected to the second mentioned means for imparting an adjustable lowering and raising movement thereto, a substantially upright beam, means providing a horizontal pivotal axis on the car and with which the beam has a longitudinal guided movement, a ballast engaging member on the bottom end portion of the beam for movement in an orbital path into and out of the ballast between adjacent ties of the track, and means carried by said second mentioned means and operatively connected to a top end portion of the beam for moving its associated ballast engaging member in an orbital path.

4. Apparatus for removing ballast from between the ties of a railway track embodying therein a car for travel upon the rails of said track, substantially upright guide means on said car, a frame engaged in said guide means for adjustable movement toward and away from the track, a plurality of upright beams with at least one arranged on each side of the longitudinal center of the track, means providing a horizontal pivotal axis on the car for each beam and with which each beam has a longitudinal guided movement, a ballast engaging member on the bottom portion of each beam for movement in an orbital path into and out of the ballast between adjacent ties of the track, and means carried by said frame and operatively connected to the top end portion of each beam for moving the associated ballast engaging members of said beams in orbital paths in different directions.

5. Apparatus for removing ballast from between the ties of a railway track embodying therein a car for travel upon the rails of said track, substantially upright guide means on said car, means engaged in said guide means for adjustment toward and away from the track, a substantially upright beam, means providing a horizontal pivotal axis on the car and with which the beam has a longitudinal guided movement, a ballast engaging member on the bottom end portion of the beam for movement in an orbital path into and out of the ballast between adjacent ties of the track, and means carried by said second mentioned means including a rotatably mounted crank arm operatively connected to a top end portion of said beam for moving its associated ballast engaging member in an orbital path.

6. Apparatus for removing ballast from between the ties of a railway track embodying therein a car for travel upon the rails of said track, substantially upright guide means on said car, a frame engaged in said guide means for adjustment toward and away from the track, a plurality of substantially upright beams arranged with at least one beam on each side of the longitudinal center of the track, means providing a horizontal pivotal axis on the car for each beam and with which each beam has a longitudinal guided movement, a ballast engaging member on the bottom end portion of each beam for movement in an orbital path into and out of the ballast between adjacent ties of the track, a plurality of crankshafts disposed parallel with said rails and each including a crank arm, and means operatively connecting each crank arm to a top end portion of an associated beam for imparting movement thereto.

7. Apparatus for removing ballast from between the ties of a railway track embodying therein a car for travel upon the rails of said track, substantially upright guide means on said car, means engaged in said guide means for adjustment toward and away from the track, a substantially upright beam, a member through which the mid portion of said beam has sliding bearing, means on said car providing aligned axes for the ends of member and whereby said member may have a rocking motion, a ballast engaging member on the bottom portion of said beam for movement in an orbital path into and out of the ballast between adjacent ties of the track, and means carried by said second mentioned means and operatively connected to a top end portion of the beam for moving the associated ballast engaging member in an orbital path.

8. Apparatus for removing ballast from between the ties of a railway track embodying therein a car for travel upon the rails of said track, substantially upright guide means on said car, means engaged in said guide means for adjustment toward and away from the track, a substantially upright beam, means providing a horizontal pivotal axis on the car and with which the beam has a longitudinal guided movement, means whereby said horizontal axis means may be adjustably moved into different elevations on the car, a ballast engaging member on the bottom end portion of the beam for movement in an orbital path into and out of the ballast between adjacent ties of the track, and means carried by said second mentioned means and operatively connected to a top end portion of the beam for moving the associated ballast engaging member in an orbital path.

9. Apparatus for removing ballast from between the ties of a railway track embodying therein a car for travel upon the rails of said track, substantially upright guide means on said car, a frame engaged in said guide means for adjustment toward and away from the track, a plurality of sets of crankshafts carried by said frame and extending parallel with said rails and each including a plurality of crank arms, substantially upright beams, one for each crank arm, means operatively connecting each crank arm to its associated beam, means providing a horizontal pivotal axis on the car for each beam and with which each beam has a longitudinal guided movement, a ballast engaging member on the bottom end portion of each beam for movement in an orbital path into and out of the ballast between adjacent ties of the track, means for driving one crankshaft in each set, and means for driving the other crankshaft in each set from the first mentioned one thereof.

10. Apparatus for removing ballast from between the ties of a railway track embodying therein a car for travel upon the rails of said track, said car including a substantially rectangular frame, with a vertical post at each corner of the frame, a secondary frame operatively engaged with said posts and whereby said secondary frame is vertically adjustable with respect to the first mentioned frame for movement therein toward and away from the track, a plurality of sets of crankshafts carried by said secondary frame and extending parallel with said rails and each including a plurality of crank arms, substantially upright beams one for and operatively connected to an associated crank arm, means providing a horizontal pivotal axis on the first mentioned frame one for each beam and with which said beam has a longitudinal sliding guided engagement, and a ballast engaging member on the bottom end portion of each beam for movement in an orbital path into and out of the ballast between adjacent ties of the track, and means for driving each set of crankshafts in the desired direction.

11. Apparatus for removing ballast from between the ties of a railway track embodying therein a car for travel upon the rails of said track, said car including a substantially rectangular frame, with a vertical post at each corner of the frame, a secondary frame operatively engaged with said posts and whereby said secondary frame is vertically adjustable with respect to the first mentioned frame for movement therein toward and away from the track, a plurality of sets of crankshafts carried by said secondary frame and extending parallel with said rails and each including a plurality of crank arms, substantially upright beams one for and operatively connected to an associated crank arm, means providing a horizontal pivotal axis one for each beam and with which the associated beam has a sliding guided engagement, means for supporting said last mentioned means upon said first mentioned frame so that said last mentioned means may be adjusted into different vertical elevations, and a ballast engaging member on the bottom portion of each beam for movement in an orbital path into and out of the ballast between adjacent ties of the track.

ALBERT W. BANTON.